(12) United States Patent
Mazajczyk et al.

(10) Patent No.: US 12,421,430 B2
(45) Date of Patent: Sep. 23, 2025

(54) COMPOSITION BASED ON (METH)ACRYLATE MONOMERS

(71) Applicant: BOSTIK SA, Colombes (FR)

(72) Inventors: Jérôme Mazajczyk, Venette (FR); Marjorie Pereira-Bayart, Venette (FR); Frédéric Simon, Venette (FR); Stéphane Fouquay, Mont Saint Aignan (FR)

(73) Assignee: BOSTIK SA, Colombes (FR)

( * ) Notice: Subject to any disclaimer, the term of this patent is extended or adjusted under 35 U.S.C. 154(b) by 68 days.

(21) Appl. No.: 18/560,574

(22) PCT Filed: May 16, 2022

(86) PCT No.: PCT/FR2022/050923
§ 371 (c)(1),
(2) Date: Nov. 13, 2023

(87) PCT Pub. No.: WO2022/243629
PCT Pub. Date: Nov. 24, 2022

(65) Prior Publication Data
US 2024/0263057 A1  Aug. 8, 2024

(30) Foreign Application Priority Data
May 17, 2021 (FR) ...................... 2105101

(51) Int. Cl.
*C09J 133/14* (2006.01)
*C08F 2/44* (2006.01)
*C08F 2/50* (2006.01)
*C08F 220/30* (2006.01)

(52) U.S. Cl.
CPC .............. *C09J 133/14* (2013.01); *C08F 2/44* (2013.01); *C08F 2/50* (2013.01); *C08F 220/302* (2020.02)

(58) Field of Classification Search
CPC ...................................................... C09J 133/14
See application file for complete search history.

(56) References Cited

U.S. PATENT DOCUMENTS

| 12,152,175 B2 * | 11/2024 | Michaud ................. C09J 11/08 |
| 2008/0023131 A1 * | 1/2008 | Pressley ..................... C08F 2/50 |
| | | 156/273.7 |
| 2010/0285282 A1 | 11/2010 | Selman et al. |
| 2015/0225626 A1 | 8/2015 | Murray et al. |
| 2015/0361284 A1 | 12/2015 | Herlihy et al. |
| 2022/0119582 A1 | 4/2022 | Michaud et al. |
| 2023/0022325 A1 | 1/2023 | Michaud et al. |

FOREIGN PATENT DOCUMENTS

| WO | 20090045703 A1 | 4/2009 |
| WO | 20200193604 A1 | 10/2020 |
| WO | 20210105603 A1 | 6/2021 |

OTHER PUBLICATIONS

ISA/EP; International Search Report and Written Opinion for International Patent Application No. PCT/FR2022/050923, dated Aug. 16, 2022, 13 pages.

* cited by examiner

*Primary Examiner* — Jeffry H Aftergut
(74) *Attorney, Agent, or Firm* — NK Patent Law

(57) ABSTRACT

The present invention relates to a two-component crosslinkable composition comprising:
  a component A comprising:
  a reducing agent;
  a metal salt chosen from the group consisting of metal salts of (meth)acrylic acid, metal salts of itaconic acid, and mixtures thereof;
  at least one (meth)acrylate monomer M1;
  a component B comprising an oxidizing agent; said composition being characterized in that it comprises at least one radical photoinitiator in component A and/or B; and also uses thereof.

16 Claims, 1 Drawing Sheet

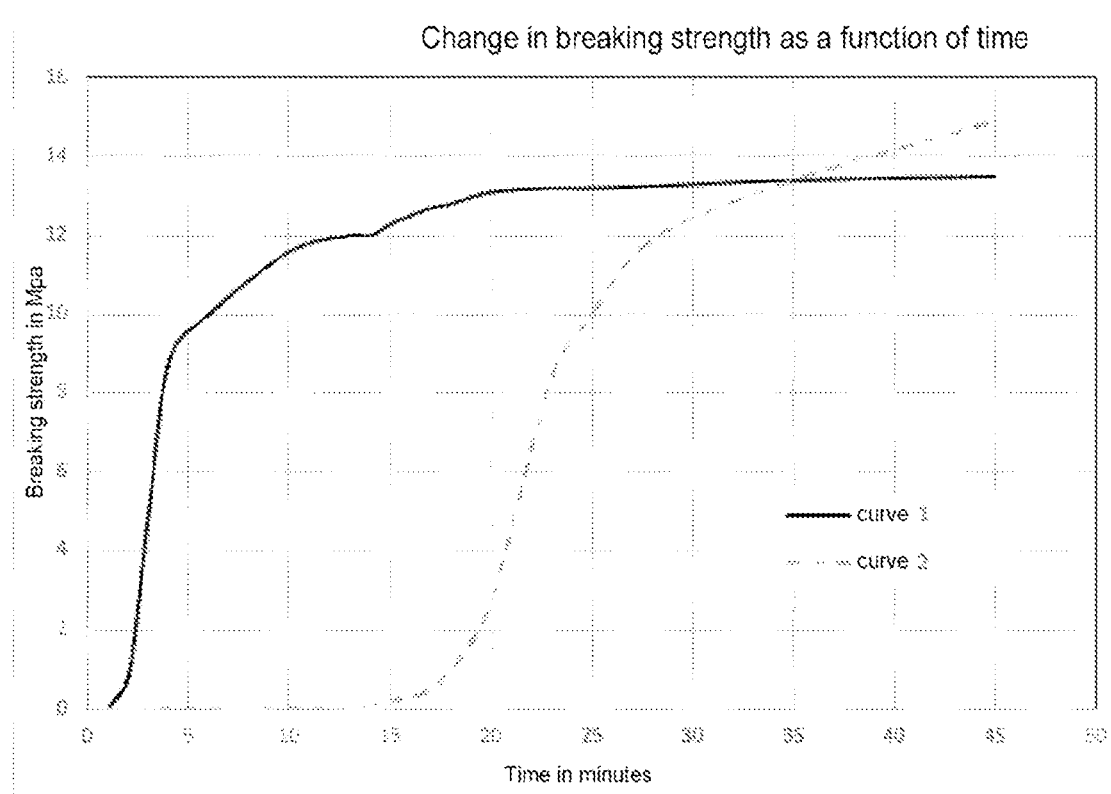

COMPOSITION BASED ON (METH)ACRYLATE MONOMERS

CROSS-REFERENCE TO RELATED APPLICATIONS

This application is a U.S. National Stage application of International Patent Application No. PCT/FR2022/050923, filed on May 16, 2022, which claims the benefit of French Patent Application No. 2105101, filed on May 17, 2021.

FIELD OF THE INVENTION

The present invention relates to a (meth)acrylate-monomer-based composition.

The invention also relates to the use of said composition in the repair and/or the semi-structural or structural adhesive bonding of materials in the transportation, marine, assembly, electronics or construction field.

TECHNOLOGICAL BACKGROUND

Acrylic compositions are known reactive systems which crosslink by radical polymerization. They are used as adhesives, mastics and coatings. Radical polymerization is typically initiated by a redox system which, by means of an oxidation-reduction reaction, results in the production of radicals.

Most acrylic systems are two-component systems. The first component conventionally contains the reducing agent and the reactive monomers, and the second component contains the oxidizing agent. Once the two components have been mixed, the reducing agent induces cleavage of the O—O bond of the organic peroxide for example, and initiates polymerization.

However, one of the problems of this technique is inhibition by oxygen. This is because the oxygen present in air in its triplet state will interact with the radicals formed at the surface of the sample, thus preventing them from initiating polymerization. This inhibition is essentially expressed at the surface since there is very little or no deep penetration of the oxygen depending on the grammage deposited. In addition, the polymerization reaction is often slow for surfaces exposed to atmospheric oxygen, which surfaces, that are partially polymerized, often remain tacky.

There is a need for new (meth)acrylic compositions which make it possible to at least partially solve at least one of the abovementioned drawbacks. More particularly, there is a need for new (meth)acrylic compositions which allow rapid deep polymerization, and make it possible to obtain a non-tacky surface.

Moreover, with a constant aim of improving the productivity of processes (level of throughput) in fields such as electronics, there is a need for new compositions which also exhibit an improved increase in cohesion, namely the achieving of minimum mechanical performance in a short time.

DESCRIPTION OF THE INVENTION

A. Composition

The present invention relates to a two-component crosslinkable composition comprising:
a component A comprising:
  a reducing agent;
  a metal salt chosen from the group consisting of metal salts of (meth)acrylic acid, metal salts of itaconic acid, and mixtures thereof;
  at least one (meth)acrylate monomer M1 having one of the formulae (I), (II) or (III) below:

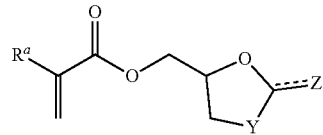

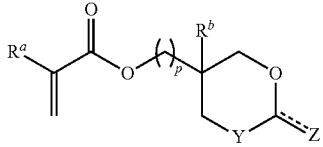

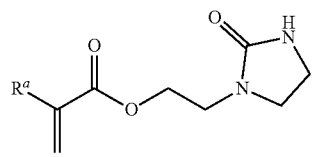

wherein:
$R^a$ represents H or a methyl;
$R^b$ represents H, methyl or ethyl;
p represents 0 or 1; and
Z represents H, O, S, an alkyl group, a benzyl group, an aryl group or an alkoxy group;
Y represents O, S, NH or $CH_2$—;

⸺ is a single bond or a double bond,
on condition that when Z represents O, then the bond ⸺ is a double bond;
a component B comprising an oxidizing agent;
said composition being characterized in that it comprises at least one radical photoinitiator in component A and/or B.

In the context of the invention, the term "alkyl" means a linear or branched radical preferably comprising from 1 to 20 carbon atoms. Mention may be made, for example, of methyl, ethyl and propyl.

In the context of the invention, the term "aryl" means a monocyclic or bicyclic aromatic radical preferably comprising from 6 to 12 carbon atoms. Mention may be made, for example, of phenyl.

In the context of the invention, the term "cycloalkyl" means a saturated, monocyclic or polycyclic, preferably monocyclic or bicyclic, system preferably comprising from 3 to 12 carbon atoms, the rings possibly being bridged or fused in pairs, such as the cyclopropyl, cyclopentyl, cyclohexyl or norbornyl groups.

In the context of the invention, the term "alkoxy" means an —O-alkyl radical.

Reducing Agent

The reducing agent can be chosen from tertiary amines, sodium metabisulfite, sodium bisulfite, transition metals, azo compounds, alpha-aminosulfones, and mixtures thereof.

Among the azo compounds, mention may for example be made of azoisobutyric acid.

Among the alpha-sulfones, mention may for example be made of bis(tolylsulfonymethyl)benzylamine.

Among the tertiary amines, mention may for example be made of diisopropanol-p-toluidine (DIIPT); dimethyl-p-toluidine; dipropoxy-p-toluidine; dimethylaniline; N,N-dimethylaminomethylphenol; N,N-diisopropanol-p-chloroaniline; N,N-diisopropanol-p-bromoaniline; N,N-diisopropanol-p-bromo-m-methylaniline; N,N-dimethyl-p-chloroaniline; N,N-dimethyl-p-bromoaniline; N,N-diethyl-p-chloroaniline; N,N-diethyl-p-bromoaniline; amines having the following formula (IV) or (V); and mixtures thereof:

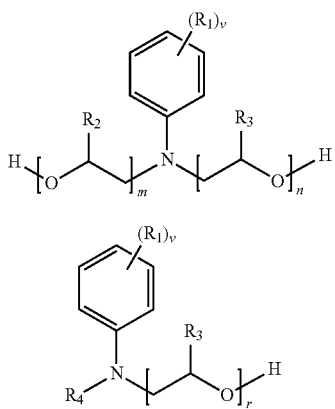

wherein:
- m and n are, independently of one another, an integer ranging from 1 to 150, preferably from 1 to 100, preferentially from 1 to 72, advantageously from 1 to 36, even more advantageously from 1 to 18;
- r is an integer ranging from 1 to 200, preferably from 1 to 104, preferentially from 1 to 72, advantageously from 1 to 36;
- $R^1$ represents a radical chosen from the group consisting of a linear or branched, saturated or unsaturated alkyl comprising from 1 to 20 carbon atoms, preferably from 1 to 10 carbon atoms; a (hetero) aryl comprising from 6 to 12 carbon atoms; a cycloalkyl comprising from 3 to 12 carbon atoms;
- v represents an integer ranging from 0 to 5;
- $R^2$ and $R^3$ represent, independently of one another, a halogen atom, a hydrogen atom or a linear or branched alkyl group comprising from 1 to 12 carbon atoms, said alkyl group being optionally interrupted by at least one oxygen atom;
- $R^4$ represents a hydrogen atom, an arylalkyl group, or a linear or branched alkyl group comprising from 1 to 20 carbon atoms, preferably an alkyl group comprising from 1 to 12 carbon atoms, advantageously from 1 to 6 carbon atoms;
- on the condition that m+n>2, preferably n+m≥2.5.

In the abovementioned formula (IV), v has a value preferably of 1 and $R^1$ is preferably in the para position.

The amines of formula (IV) are preferably chosen from those wherein:
- $R^1$ represents a saturated or unsaturated and linear or branched alkyl comprising from 1 to 20 carbon atoms, preferably from 1 to 10 carbon atoms; preferentially, $R^1$ represents methyl;
- m and n represent, independently of one another, an integer ranging from 1 to 18, preferably from 1 to 9, advantageously from 1 to 5;
- $R^2$ and $R^3$ represent, independently of one another, a hydrogen atom or a linear or branched alkyl group comprising from 1 to 12 carbon atoms, said alkyl group being optionally interrupted by at least one oxygen atom; preferably, $R^2$ and $R^3$ each represent a hydrogen atom;
- with m+n>2, preferably n+m≥2.5.

Preferably, the amines of formula (IV) are those wherein:
- $R^1$ represents a linear or branched alkyl comprising from 1 to 5 carbon atoms; preferentially, $R^1$ represents methyl;
- m and n represent, independently of one another, an integer ranging from 1 to 18, preferably from 1 to 9, advantageously from 1 to 5;
- $R^2$ and $R^3$ represent a hydrogen atom;
- with that m+n>2, preferably n+m≥2.5.

Mention may be made, among the amines of formula (IV), for example, of Bisomer® PTE (CAS number: 878391-30-1) sold by Geo Specialty Chemicals, Accelerator PT25E (CAS number: 878391-30-1) sold by Lanxess, N,N-bis(2-hydroxypropyl)-p-aniline (CAS number: 3077-13-2) available from Biosynth, N,N-bis(2-hydroxypropyl)-p-toluidine (CAS number: 38668-48-3) sold by BASF, Ethox ANA-10 (CAS number: 36356-83-9) available from Ethox Chemical.

In the abovementioned formula (V), v has a value preferably of 1 and $R^1$ is preferably in the para position.

The amines of formula (V) are preferably chosen from those wherein:
- $R^1$ represents a saturated or unsaturated and linear or branched alkyl comprising from 1 to 20 carbon atoms, preferably from 1 to 10 carbon atoms; preferentially, $R^1$ represents methyl;
- r represents an integer ranging from 1 to 36, preferably from 1 to 18, advantageously from 1 to 10;
- $R^3$ represents a halogen atom, a hydrogen atom or a linear or branched alkyl group comprising from 1 to 12 carbon atoms, said alkyl group being optionally interrupted by at least one oxygen atom;
- $R^4$ represents a hydrogen atom, an arylalkyl group, or a linear or branched alkyl group comprising from 1 to 20 carbon atoms, preferably from 1 to 6 carbon atoms.

Mention may be made, among the amines of formula (V), for example, of N-(2-hydroxyethyl)-N-methylaniline (CAS number: 93-90-3) available from Sigma-Aldrich and N-(2-hydroxyethyl)-N-methyl-p-toluidine (MHPT, CAS number: 2842-44-6) available from Parchem.

Preferably, component A comprises a tertiary amine as reducing agent, and even more preferentially an amine of formula (IV) mentioned above.

Component A may comprise a total content of reducing agent(s) ranging from 0.3% to 5%, preferably from 1% to 3%, by weight relative to the total weight of said component A.

Metal Salt

The metal salt is chosen from metal salts of (meth)acrylic acid, metal salts of itaconic acid, and mixtures thereof.

The metal salt of (meth)acrylic acid may be chosen from zinc salts of (meth)acrylic acid, iron salts of (meth)acrylic acid, magnesium salts of (meth)acrylic acid, calcium salts of (meth)acrylic acid, and mixtures thereof.

The metal salt of (meth)acrylic acid may be chosen from zinc diacrylate, zinc dimethacrylate, zinc monomethacrylate, iron diacrylate, iron dimethacrylate, iron monomethacrylate, calcium diacrylate, calcium dimethacrylate, calcium monomethacrylate, magnesium diacrylate, magnesium dimethacrylate, magnesium monomethacrylate, and mixtures thereof.

The metal salt of itaconic acid may be chosen from zinc salts of itaconic acid, iron salts of itaconic acid, magnesium salts of itaconic acid, calcium salts of itaconic acid, and mixtures thereof.

Preferably, the metal salt is a metal salt of (meth)acrylic acid, and more preferentially a zinc salt of (meth)acrylic acid, and even more preferentially zinc diacrylate or zinc dimethacrylate.

Such metal salts can be found commercially, such as, for example, Dymalink® 708 sold by Total (zinc methacrylate salt) or else zinc itaconate (CAS No. 64723-16-6) sold by Alfa Chemistry.

The total content of metal salt(s) as defined above in component A can range from 0.1% to 5% by weight, preferably from 0.5% to 3% by weight, and even more preferentially from 0.5% to 2% by weight relative to the total weight of said component A.

(Meth)Acrylate Monomer M1

Component A according to the invention comprises at least one (meth)acrylate monomer M1 as defined above.

According to one embodiment, in formulae (I) and (II) above, Y represents an oxygen atom.

The (meth)acrylate monomer M1 may be chosen from the following monomers:

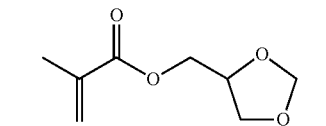
(I-A)

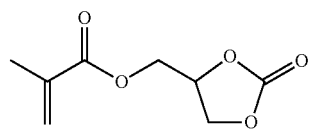
(I-B)

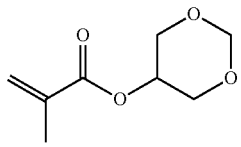
(II-A)

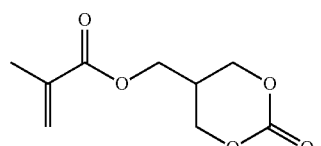
(II-B)

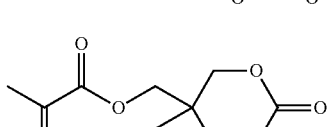
(II-C)

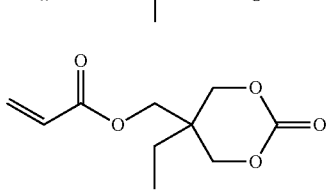
(II-D)

-continued

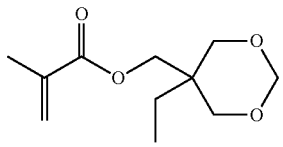
(II-E)

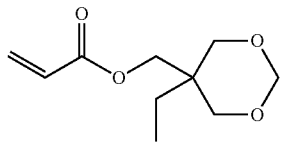
(II-F)

The monomer M1 is preferably chosen from the monomers of formula (I) or (II).

It is even more preferentially one of the following compounds or mixtures thereof:

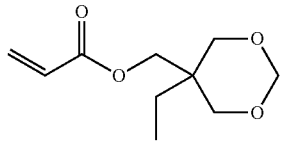
(II-F)

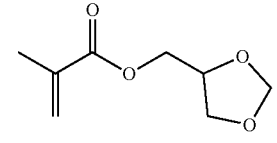
(I-A)

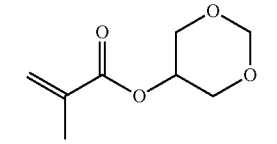
(II-A)

The total content of (meth)acrylate monomer(s) M1 in component A may be greater than or equal to 20% by weight, preferably from 20% to 70% by weight, relative to the total weight of said component A.

The total content of (meth)acrylate monomer(s) M1 in the two-component crosslinkable composition according to the invention may range from 20% to 90% by weight, preferably from 40% to 90% by weight relative to the total weight of said two-component crosslinkable composition.

Oxidizing Agent

The oxidizing agent can be chosen from peroxides, organic salts of transition metals, compounds containing a labile chlorine, and mixtures thereof.

The peroxide can be chosen from organic peroxides, inorganic peroxides and mixtures thereof.

Mention may be made, among the inorganic peroxides, of peroxydisulfuric acid and its salts, such as ammonium peroxodisulfate, sodium peroxodisulfate and potassium peroxodisulfate.

Among the organic peroxides, mention may be made of cumene hydroperoxide, para-menthane hydroperoxide, tert-butyl peroxyisobutyrate, tert-butyl peroxybenzoate, tert-butyl peroxyneodecanoate, tert-amyl peroxypivalate, acetyl peroxide, benzoyl peroxide, dibenzoyl peroxide, 1,3-bis-(t-butylperoxyisopropyl)benzene, diacetyl peroxide, t-butyl-cumyl peroxide, tert-butyl peroxyacetate, cumyl peroxide 2,5-dimethyl-2,5-di-t-butylperoxyhexane, 2,5-dimethyl-2,5-di-t-butyl-peroxyhex-3-yne, 4-methyl-2,2-di-t-butylperoxypentane, and mixtures thereof.

Preferably, component B comprises benzoyl peroxide as oxidizing agent.

Component B may comprise a total content of oxidizing agent(s) ranging from 9% to 50% by weight, preferably from 10% to 40%, by weight relative to the total weight of said component B.

The composition according to the invention may typically comprise a redox system, a reducing agent which is included in component A and an oxidizing agent which is included in component B. The following combinations may be mentioned, for example:

persulfates (oxidizing agent)/(sodium metabisulfite and/or sodium bisulfite) (reducing agents);

organic peroxides (oxidizing agent)/tertiary amines (reducing agent);

organic hydroperoxides (oxidizing agent)/transition metals (reducing agent).

Radical Photoinitiator

The composition according to the invention can be polymerized or crosslinked under electromagnetic radiation.

The composition according to the invention may comprise from 0.1% to 5% by weight, preferably from 0.5% to 3% by weight, even more preferentially from 1% to 2% by weight, of radical photoinitiator(s), relative to the total weight of the composition.

Component A may comprise a total content of radical photoinitiator(s) ranging from 0.1% to 3% by weight, preferably from 0.5% to 2% by weight, relative to the total weight of said component A.

The radical photoinitiator is preferably present in component A.

The radical photoinitiator may be any radical photoinitiator known to those skilled in the art. Under the action of UV/visible radiation, the radical photoinitiator generates radicals which will be responsible for the initiation of the photopolymerization reaction, and makes it possible in particular to increase the efficiency of the photopolymerization reaction. This is, of course, chosen as a function of the light source used, according to its ability to efficiently absorb the radiation selected. It will be possible, for example, to choose the appropriate radical photoinitiator from its UV/visible absorption spectrum. Advantageously, the radical photoinitiator is appropriate for working with irradiation sources emitting in the near zone of the visible region. Advantageously, the source of the UV or visible radiation may be a LED or UVA-centered broad-spectrum lamp of the Delolux 03 S type.

The radical photoinitiator may be chosen from the group consisting of:

type I radical photoinitiators chosen from:
the family of acetophenones and alkoxyacetophenones, for instance 2,2-dimethoxy-2-phenylacetophenone and 2-diethyl-2-phenylacetophenone;
the family of hydroxyacetophenones, for instance 2,2-dimethyl-2-hydroxyacetophenone, 1-hydroxycyclohexyl phenyl ketone, 2-hydroxy-4'-(2-hydroxyethoxy)-2-methylpropiophenone and 2-hydroxy-4'-(2-hydroxypropoxy)-2-methylpropiophenone;
the family of alkylaminoacetophenones, for instance 2-methyl-4'-(methylthio)-2-morpholinopropiophenone, 2-benzyl-2-(dimethylamino)-4-morpholinobutyrophenone and 2-(4-methylbenzyl)-2-(dimethylamino)-4-morpholinobutyrophenone;
the family of benzoin ethers, for instance benzyl, benzoin methyl ether and benzoin isopropyl ether;
the family of phosphine oxides, for instance diphenyl (2,4,6-ethyl(2,4,6-trimethylbenzoyl) phosphine oxide (TPO), trimethylbenzoyl)phenylphosphine oxide (TPO-L) and bis(2,6-dimethoxybenzoyl)-2,4,4-trimethylphenylphosphine oxide (BAPO);
the family of metallocenes, for instance ferrocene, bis(η5-2,4-cyclopentadien-1-yl)bis(2,6-difluoro-3-(1H-pyrrol-1-yl)phenyl)titanium and (cumene) (cyclopentadienyl) iron hexafluorophosphate;

type II radical photoinitiators chosen from:
the family of benzophenones, for instance 4-phenylbenzophenone, 4-(4'-methylphenylthio)benzophenone or 1-[4-[[(4-benzoylphenyl)thio]phenyl]-2-methyl-2-[(4-methylphenyl)sulfonyl]-1-propanone;
the family of thioxanthones, for instance isopropylthioxanthone (ITX), 2,4-diethylthioxanthone, 2,4-dimethylthioxanthone, 2-chlorothioxanthone and 1-chloro-4-isopropylthioxanthone;
the family of benzoylformate esters, for instance methyl benzoylformate;
the family of dibenzylidene ketones, for instance p-dimethylamino ketone;
the family of coumarins, for instance 5-methoxy- and 7-methoxycoumarin, 7-diethylaminocoumarin and N-phenylglycine coumarin;
radical photoinitiators of the family of dyes, for instance triazines, fluorones, cyanines, safranins, 4,5,6,7-tetrachloro-3',6'-dihydroxy-2',4',5',7'-tetraiodo-3H-spiro[isobenzofuran-1,9'-xanthen]-3-one, pyryliums and thiopyryliums, thiazines, flavins, pyronines, oxazines or rhodamines;

and mixtures thereof.

Preferably, the radical photoinitiator is chosen from the following radical photoinitiators:
the family of phosphine oxides, for instance diphenyl(2,4,6-trimethylbenzoyl) phosphine oxide (TPO), ethyl(2,4,6-trimethylbenzoyl)phenylphosphine oxide (TPO-L) and bis(2,6-dimethoxybenzoyl)-2,4,4-trimethylphenylphosphine oxide (BAPO);
the family of thioxanthones, for instance isopropylthioxanthone (ITX), 2,4-diethylthioxanthone, 2,4-dimethylthioxanthone, 2-chlorothioxanthone and 1-chloro-4-isopropylthioxanthone;
the radical photoinitiator being even more preferentially chosen from diphenyl-(2,4,6-trimethylbenzoyl) phosphine oxide (TPO), ethyl-(2,4,6-trimethylbenzoyl)phenylphosphine oxide (TPO-L) and bis-(2,6-dimethoxybenzoyl)-2,4,4-trimethylphenylphosphine oxide (BAPO).

For example, when the source of the UV or visible radiation is an LED, the radical photoinitiator may be chosen from 2,4,6-trimethylbenzoyldiphenylphosphine or TPO available, for example, from Lambson under the commercial reference Speedcure® TPO (CAS: 75980-60-8), ethyl(2,4,6-trimethylbenzoyl)phenylphosphinate or TPO-L available, for example, from Lambson under the commercial reference Speedcure® TPO-L (CAS: 84434-11-7), phenylbis(2,4,6-trimethylbenzoyl) phosphine oxide or BAPO (CAS: 162881-26-7) available, for example, from BASF under the commercial reference Irgacure® 819, 2-benzyl-2-dimethylamino-1-(4-morpholinophenyl)-1-butanone (CAS: 119313-12-1) available, for example, from BASF under the commercial reference Irgacure® 369, 2-methyl-1-[4-(methylthio)phenyl]-2-(4-morpholinyl)-1-propanone (CAS: 71868-10-5) available, for example, from BASF under the commercial reference Irgacure® 907, 1-hydroxycyclohexyl phenyl ketone (CAS: 947-19-3) available, for example, from BASF under the commercial reference Irgacure® 184, 2-isopropylthioxanthone or ITX (CAS: 5495-84-1) available, for example, under the reference Speedcure® 2-ITX, or mixtures thereof.

Polymerization Inhibitor

The composition according to the invention may comprise one or more polymerization inhibitor(s).

The total content of polymerization inhibitor(s) is preferably less than or equal to 0.25%, preferentially less than or equal to 0.20% by weight, and advantageously less than or equal to 0.10% by weight relative to the total weight of said composition.

The polymerization inhibitor may be any type of polymerization inhibitor known to those skilled in the art.

It may for example be chosen from hydroquinone, hydroquinone monomethyl ether (4-hydroxyanisole, MEHQ), 1,4-benzoquinone, 1,4-napthoquinone, catechol, pyrogallol, bisphenol A, para-(tert-butyl) phenol, phenothiazine, and mixtures thereof.

More preferably, the polymerization inhibitor is hydroquinone monomethyl ether (MEHQ).

Additives

The two-component composition according to the invention can comprise at least one additive chosen from the group consisting of catalysts, fillers, antioxidants, light stabilizers/UV absorbers, metal deactivators, antistatics, film-preventing agents, foaming agents, biocides, plasticizers, lubricants, emulsifiers, dyes, pigments, rheological agents, impact modifiers, adhesion promoters, optical brighteners, flame retardants, anti-sweating agents, nucleating agents, solvents, and mixtures thereof.

These additives may be present in component A and/or component B of the composition according to the invention.

As examples of plasticizers that may be used, mention may be made of any plasticizer normally used in the field of adhesives, for instance epoxy resins, phthalates, benzoates, trimethylolpropane esters, trimethylolethane esters, trimethylolmethane esters, glycerol esters, pentaerythritol esters, naphthenic mineral oils, adipates, cyclohexyldicarboxylates, paraffinic oils, natural oils (optionally epoxidized), polypropylenes, polybutylenes, hydrogenated polyisoprenes, and mixtures thereof.

Preferably, use is made of:
  diisodecyl phthalate, as sold, for example, under the name Palatinol™ DIDP by BASF,
  an ester of alkylsulfonic acid and of phenol, as sold, for example, under the name Mesamoll® by Lanxess,
  diisononyl 1,2-cyclohexanedicarboxylate, as sold, for example, under the name Hexamoll Dinch® by BASF,
  pentaerythritol tetravalerate, as sold, for example, under the name Pevalen™ by Perstorp,
  the epoxidized soya bean oil as sold, for example, under the name Vikoflex® 7170 by Arkema.

As examples of (thixotropic) rheological agent(s) that may be used, mention may be made of any rheological agent customarily used in the field of adhesive compositions.

Preferably, the thixotropic agents are chosen from:
  PVC plastisols, corresponding to a suspension of PVC in a plasticizing agent which is miscible with PVC, obtained in situ by heating to temperatures ranging from 60° C. to 80° C. These plastisols may be those described in particular in the publication Polyurethane Sealants, Robert M. Evans, ISBN 087762-998-6,
  fumed silica, as sold, for example, under the name HDK® N20 by Wacker;
  urea derivatives resulting from the reaction of an aromatic diisocyanate monomer, such as 4,4'-MDI, with an aliphatic amine, such as butylamine. The preparation of such urea derivatives is described notably in patent application FR 1 591 172;
  micronized amide waxes, such as Crayvallac® SLT or Crayvallac® SLA sold by Arkema.

The composition according to the invention may also comprise at least one organic and/or mineral filler.

The mineral filler(s) that may be used are advantageously chosen so as to improve the mechanical performance of the composition according to the invention in the crosslinked state.

As examples of mineral filler(s) that may be used, use may be made of any mineral filler(s) usually used in the field of adhesive compositions. These fillers are typically provided in the form of particles of diverse geometry. They may be, for example, spherical or fibrous or may have an irregular shape.

Preferably, the filler(s) are chosen from the group consisting of clay, quartz, carbonate fillers, kaolin, gypsum, clays and mixtures thereof; preferentially, the filler(s) are chosen from carbonate fillers, such as alkali metal or alkaline-earth metal carbonates, and more preferentially calcium carbonate or chalk.

These fillers may be untreated or treated, for example using an organic acid, such as stearic acid, or a mixture of organic acids predominantly consisting of stearic acid.

Use may also be made of hollow mineral microspheres, such as hollow glass microspheres, and more particularly of those made of calcium sodium borosilicate or of aluminosilicate.

According to one preferred embodiment, component B does not comprise any mineral filler, and even more preferentially the composition according to the invention does not comprise any mineral filler.

The composition according to the invention may also comprise at least one adhesion promoter, preferably chosen from silanes, such as aminosilanes, epoxysilanes or acryloyl silanes, or adhesion promoters based on a phosphate ester, for instance the 2-hydroxyethyl methacrylate phosphate ester, 2-methacryloyloxyethyl phosphate, bis(2-methacryloyloxyethyl phosphate), 2-acryloyloxyethyl phosphate, bis (2-acryloyloxyethyl phosphate), methyl-(2-methacryloyloxyethyl phosphate), ethyl-(2-methacryloyloxyethyl phosphate), a mixture of 2-hydroxyethyl methacrylate mono- and diphosphate esters.

When a solvent, in particular a volatile solvent, is present in the composition, its content is preferably less than or equal to 5% by weight, more preferably less than or equal to 3% by weight, relative to the total weight of the composition.

Preferably, the content of solvent(s) in the composition is between 0% and 5% by weight.

When a pigment is present in the composition, its content is preferably less than or equal to 3% by weight, more preferably less than or equal to 2% by weight, relative to the total weight of the composition. When it is present, the pigment can, for example, represent from 0.1% to 3% by weight or from 0.4% to 2% by weight relative to the total weight of the composition.

The pigments may be organic or inorganic pigments.

For example, the pigment is $TiO_2$, in particular Kronos® 2059 sold by Kronos.

The composition may comprise an amount of from 0.1% to 3%, preferably from 1% to 3%, by weight of at least one UV stabilizer or antioxidant. These compounds are typically introduced in order to protect the composition from degradation resulting from a reaction with oxygen which is liable to be formed by the action of heat or light. These compounds may include primary antioxidants which trap free radicals. The primary antioxidants can be used alone or in combination with other secondary antioxidants or UV stabilizers.

Mention may be made, for example, of Irganox® 1010, Irganox® B561, Irganox® 245, Irgafos® 168, Tinuvin® 328 or Tinuvin™ 770, which are sold by BASF.

The composition may comprise at least one acrylic block copolymer. The acrylic block copolymers are typically impact modifiers.

The acrylic block copolymers can be copolymers comprising:
- from 1% to 99% of at least one rigid block (A), the glass transition temperature of which is greater than the ambient temperature by at least 20° C.;
- from 1% to 99% by weight of at least one flexible block (B), the glass transition temperature of which is less than the ambient temperature by at least 10° C.

Preferably, the copolymers are triblocks comprising rigid blocks/flexible blocks/rigid blocks, wherein:
- at least one rigid block (A) of the copolymer advantageously consists of monomer units derived from at least one methacrylate of formula $CH_2=C(CH_3)-COOR_i$ where $R_i$ is a linear or branched $C_1$-$C_3$ alkyl group, a branched $C_4$ group, a $C_3$-$C_8$ cycloalkyl group, a $C_6$-$C_{20}$ aryl group, a $C_7$-$C_{30}$ arylalkyl group containing a $C_1$-$C_4$ alkyl group, a heterocyclic group or a heterocyclylalkyl group containing a $C_1$-$C_4$ alkyl group; and
- the flexible block (B) advantageously contains:
  (i) monomeric units derived from at least one alkyl acrylate of formula $CH_2=CH-COOR_j$ where $R_j$ is a linear or branched $C_1$-$C_{12}$ alkyl group, and/or
  (ii) monomeric units derived from at least one methacrylate of formula $CH_2=C(CH_3)-COOR_k$ where $R_k$ is a linear $C_4$-$C_{12}$ alkyl group or a branched $C_5$-$C_{12}$ alkyl group.

The rigid block (A) preferably comprises monomeric units derived from methyl methacrylate monomers.

The rigid block (A) may also comprise at least one dialkylacrylamide monomer, the linear or branched alkyl groups of which comprise from 1 to 10 carbon atoms, such as N,N-dimethylacrylamide.

The flexible block (B) preferably comprises monomeric units derived from at least one monomer chosen from butyl acrylate, 2-ethylhexyl acrylate, hydroxyethyl acrylate, 2-ethylhexyl methacrylate, n-octyl acrylate, and mixtures thereof.

Preferentially, the copolymer is a polymethyl methacrylate/poly(n-butyl acrylate)/polymethyl methacrylate block copolymer.

Among the acrylic block copolymers, mention may for example be made of Nanostrength® sold by Arkema (M52 comprising 52% by weight of poly(n-butyl acrylate), or M75 comprising approximately 75% by weight of poly(n-butyl acrylate), or M65 comprising approximately 65% by weight of poly(n-butyl acrylate)).

The composition may comprise an impact modifier having a core-shell-type structure, typically known as a "core-shell impact modifier".

Impact modifiers are well known to those skilled in the art, and comprise in particular core-shell impact modifiers.

The core-shell impact modifier may be in the form of spherical particles. The weight average particle size (diameter) can range from 40 nm to 900 nm, preferably from 80 to 500 nm. The particle size can be measured with a Zetasizer (Malvern).

The core-shell impact modifier can be obtained by any process known to those skilled in the art, for example by a multistep process as described in FR 3 052 169 or in EP 2 465 884. In particular, the polymer is prepared by emulsion polymerization.

The core of the impact modifier may comprise a polymer L1 chosen from isoprene homopolymers, butadiene homopolymers, isoprene-butadiene copolymers, isoprene-vinyl monomer copolymers, butadiene-vinyl monomer copolymers. The vinyl monomer can be chosen from styrene, alkylstyrene, acrylonitrile, alkyl (meth)acrylates, butadiene or isoprene.

The shell may comprise a polymer L2 obtained from (meth)acrylic monomers such as, for example, those chosen from $C_1$-$C_{12}$ alkyl (meth)acrylates. In particular, the shell comprises a polymer L2 obtained from $C_1$-$C_4$ alkyl methacrylate monomers and/or $C_1$-$C_8$ alkyl acrylate monomers.

Preferably, the shell comprises a polymer L2 obtained from methyl acrylate, propyl acrylate, isopropyl acrylate, butyl acrylate, methyl methacrylate, ethyl methacrylate, butyl methacrylate, and mixtures thereof.

According to one embodiment, the core-shell impact modifier comprises:
- a core comprising a polymer L1 which is a butadiene-styrene copolymer;
- a shell comprising a polymer L2 which is a poly(methyl methacrylate) (PMMA).

The core-shell impact modifiers may be commercially available. Mention may be made, for example, of Clearstrength® (for example Clearstrength® XT100) or the Durastrength® products sold by Arkema. Mention may also be made of the Paraloids (Paraloid 2650A, Paraloid 2691A) sold by Dow Corning.

The total content of impact modifier(s) in component A may range from 2% to 30% by weight, preferably from 5% to 20% by weight relative to the total weight of component A.

The composition can comprise at least one urethane-acrylate having a number-average molecular weight of greater than or equal to 2000 g/mol, preferentially greater than or equal to 4000 g/mol.

The urethane-acrylates can be obtained by reaction between a polyol and a polyisocyanate, followed by functionalization with for example hydroxymethyl methacrylate.

There are many commercially available urethane-acrylates, in particular from Sartomer.

In the composition according to the invention, the component A/component B volume ratio may range from 20/1 to 1/1, preferentially from 10/1 to 1/1.

B. Ready-to-Use Kit

The present invention also relates to a ready-to-use kit, comprising both component A as defined above and component B as defined above, packaged in two separate compartments. It may, for example, be a two-component cartridge.

Indeed, the composition according to the invention may be in a two-component form, for example in a ready-to-use kit, comprising both component A in a first compartment or drum and component B in a second compartment or drum, in proportions suitable for direct mixing of the two components, for example using a metering pump.

According to one embodiment of the invention, the kit also comprises one or more means for mixing components A and B. Preferably, the mixing means are chosen from metering pumps or static mixers with a diameter suited to the amounts used.

C. Uses of the Composition

The present invention also relates to the use of a two-component crosslinkable composition as defined above as adhesive, mastic or coating, preferably as adhesive.

The invention also relates to the use of said composition in the repair and/or the structural or semi-structural adhesive bonding of materials in the transportation, motor vehicle (car, bus or truck), assembly, marine, electronics or construction field.

The present invention relates to a process for assembling two substrates by adhesive bonding, involving:
- coating, onto at least one of the two substrates to be assembled, a composition obtained by mixing components A and B as defined above; and then
- bringing the two substrates into effective contact;
- crosslinking the composition by subjecting it to electromagnetic irradiation.

The crosslinking step may be performed at a temperature of between 0° C. and 200° C., preferably between 10° C. and 150° C., preferably between 23 and 80° C. and in particular between 20° C. and 25° C.

The appropriate substrates are, for example, inorganic substrates, such as concrete, metals or alloys (such as aluminum alloys, steel, non-ferrous metals and galvanized metals); or else organic substrates, such as wood, plastics, such as PVC, polycarbonate, PMMA, polyethylene, polypropylene, polyesters, epoxy resins; substrates made of metal and composites coated with paint.

The crosslinking can be done with a UV radiation source or with an LED.

The crosslinking step under electromagnetic irradiation may be performed at a wavelength greater than 300 nm, preferably ranging from 360 nm to 680 nm, and even more preferentially from 360 nm to 420 nm.

Preferably, the electromagnetic irradiation step is carried out with an intensity of less than or equal to 300 mW/cm$^2$, preferentially less than or equal to 200 mW/cm$^2$, for example less than or equal to 100 mW/cm$^2$.

The compositions according to the invention advantageously lead to at least one of the following advantages:
- good storage stability;
- high reactivity;
- good adhesive properties after crosslinking;
- a dry and non-tacky surface of the crosslinked compositions, which makes it possible in particular to increase the productivity of industrial processes;
- a very rapid increase in cohesion (for example reaching lap shear mechanical performance levels of 5 to 6 MPa in less than 5 minutes), thereby advantageously making it possible to improve the productivity of processes with higher throughputs.

All the embodiments described above may be combined with each other. In particular, the various abovementioned constituents of the composition, and notably the preferred embodiments of the composition, may be combined with each other.

In the context of the invention, the term "between x and y" or "ranging from x to y" means a range wherein the limits x and y are included. For example, the range "between 0% and 25%" notably includes the values 0% and 25%.

The invention is now described in the following implementation examples, which are given purely by way of illustration and should not be interpreted in order to limit the scope thereof.

EXAMPLES

The following ingredients were used:
- Speedcure® TPO-L (CAS: 84434-11-7) sold by Lambson: ethyl(2,4,6-trimethylbenzoyl) phenyl phosphinate;
- Bisomere® PTE (CAS number: 103671-44-9) sold by GEO Specialty Chemicals;
- Peroxan BP 50 PF1 sold by PERGAN is a paste containing 50% dibenzoyl peroxide;
- Crayvallac® SLT sold by Arkema is a micronized amide wax used as rheological agent;
- Visiomer® Glyfoma (CAS: 1620329-57-9) sold by Evonik Industries and with a molar mass equal to 172.2 g/mol, mixture of glycerol formal methacrylate isomers,
- SR9054 (CAS number: 1628778-81-3) sold by Sartomer: difunctional acrylic acid adhesion promoter;
- Aerosil® R202 (CAS number: 67762-90-7): a hydrophobic fumed silica (post-treated PDMS) having a specific surface area (BET) equal to 100±20 m2/g sold by Evonik;
- Clearstrength® XT100 sold by Arkema: a core-shell impact modifier based on MBS (MMA-butadiene-styrene);
- Vikoflex® 7170 sold by Arkema is an epoxidized soybean oil used as a plasticizer;
- PRO22641: urethane-methacrylate oligomer with a functionality of 2 from Sartomer;
- Dymalink® 708F: zinc bismethacrylate sold by Total;
- methacrylic acid sold by Arkema.

Example 1: Preparation of the Compositions

In a disperser-type mixer (Dispermat) with constant stirring and under nitrogen, the Crayvallac® SLT, 20% of the total amount of Visiomer Glyfoma and Pro 22641 are mixed at moderate speed at 25° C. for 30 minutes and then the mixture is brought to 65° C. with vigorous stirring and then maintained at 65° C. for 0.5 h.

The mixture is then brought back to 50° C. with moderate stirring, and the remainder of the Visiomer® Glyfoma is then added.

At 40° C., Clearstrength® XT 100 is introduced twice with moderate stirring and, after verification of good dispersion, the other ingredients constituting component A are added in the proportions indicated in the following table at a temperature of 30° C., in the following order: methacrylic acid, SR9054, Bisomer® PTE, Dymalink® 708, Aerosil® R202 and then finally TPO-L protected from ambient light. Component A is kept away from ambient light.

Vikoflex® 7170 and CrayVallac® SLT are introduced into and mixed at 25° C. in a disperser-type mixer (Dispermat) maintained under constant stirring and under nitrogen, then the mixture is brought to 65-70° C. and maintained at 65-70° C. for 30 minutes with vigorous stirring. The mixture is then cooled to 25° C. and Peroxan BP 50 PF1 is introduced with stirring.

| Composition No. 1 (invention) | | | |
| --- | --- | --- | --- |
| Component A | | Component B | |
| Ingredients | % by weight (relative to the total weight of A) | Ingredients | % by weight (relative to the total weight of B) |
| Visiomer® Glyfoma | 50.7 | Peroxan BP50 PF1 | 22 |

-continued

Composition No. 1 (invention)

| | Component A | | Component B |
|---|---|---|---|
| Ingredients | % by weight (relative to the total weight of A) | Ingredients | % by weight (relative to the total weight of B) |
| Pro 22641 | 21.3 | Vikoflex ® 7170 | 73 |
| Speedcure ® TPO-L | 1.1 | Crayvallac ® SLT | 5 |
| Bisomere ® PTE | 1.1 | | |
| Methacrylic acid | 1 | | |
| Clearstrength ® XT100 | 16.8 | | |
| Silica ® R202 | 3.4 | | |
| SR9054 | 1.1 | | |
| Dymalink ® 708 | 1 | | |
| Crayvallac ® SLT | 2.5 | | |
| TOTAL | 100 | TOTAL | 100 |

Component A and component B above were mixed, in a 10:1 volume ratio (component A:component B).

The mixing is carried out at a temperature of approximately 23° C., according to the given volume ratio, with a static mixer and deposited on the substrate.

Comparative composition No. 2 was prepared in a similar manner to that which was done for composition No. 1. Comparative composition No. 2 contains neither a radical photoinitiator nor a metal salt of methacrylate.

Composition No. 2 (comparative)

| | Component A | | Component B |
|---|---|---|---|
| Ingredients | % by weight (relative to the total weight of A) | Ingredients | % by weight (relative to the total weight of B) |
| Visiomer ® Glyfoma | 51.8 | Peroxan BP 50 PF1 | 22 |
| PRO22641 | 22 | Vikoflex ® 7170 | 73 |
| Bisomere ® PTE | 1.1 | Crayvallac ® SLT | 5 |
| Methacrylic acid | 1 | | |
| Clearstrength ® XT100 | 17 | | |
| Silica ® R202 | 3.5 | | |
| SR9054 | 1.1 | | |
| Crayvallac ® SLT | 2.5 | | |
| TOTAL | 100 | TOTAL | 100 |

Component A and component B above were mixed, in a 10:1 volume ratio (component A:component B).

Example 2: Results

Adhesive Bonding Tests

The adhesive bondings are produced on strips made of aluminum originating from Rocholl. An area of 25×12.5 mm was delimited on a strip using wedges made of Teflon with a thickness of 250 μm. This area was filled with the test composition and then a second strip of the same material was laminated. The adhesive bonding is then irradiated on each of the two wafers under a UVA lamp (Delolux 03S) with an intensity of 20 mW/cm² for 1 minute ((30 seconds per wafer) and then tested at various times in a lap shear test according to the standard ISO 4587 (2003).

The aim of the tensile testing on a universal testing machine is to evaluate the maximum force (in MPa) to be exerted on the assemblage in order to separate it. Recourse to a tensile testing device makes it possible to subject a lap joint placed between two rigid supports to a shear stress up to failure by exerting tension on the supports parallel to the surface of the assemblage and to the main axis of the test specimen. The result to be recorded is the breaking force or stress. The shear stress is applied via the movable jaw of the tensile testing device with a displacement at the rate of 5 mm/min. This tensile testing method is carried out as defined by the standard ISO 4587.

FIG. 1 describes a graph representing the breaking strength (in MPa)=f(time in min) for compositions No. 1 (curve 1) and No. 2 (curve 2, comparative).

FIG. 1 shows that composition No. 1 according to the invention (curve 1) exhibits a faster increase in cohesion than comparative composition No. 2 (curve 2). In fact, composition No. 1 advantageously makes it possible to achieve performance levels of 5 MPa in less than 5 minutes, while comparative composition No. 2 reaches such a value in more than 15 minutes.

Moreover, it was observed that the polymer obtained with composition No. 1 is advantageously dry at the surface (tack-free) more rapidly; thus, the oxygen did not have time to inhibit the surface.

Stability Test

The stability of composition 1 was also tested via a one-month aging test at 40° C. The adhesive bonding tests described above were carried out comparatively between the formula at t=0 and the aged formula at t=1 month at 40° C.

The breaking strengths obtained after 24 hours are given in the table below

| | Composition No. 1 (invention) |
|---|---|
| Breaking strength in MPa at t = 0 | 14.3 |
| Breaking strength in MPa at t = 1 month at 40° C. | 13 |

Good retention of the adhesive bonding is advantageously observed after aging of composition No. 1 for 1 month at 40° C.

The invention claimed is:

1. A two-component crosslinkable composition comprising:
   a component A comprising:
   a reducing agent;
   a metal salt selected from the group consisting of metal salts of (meth)acrylic acid, metal salts of itaconic acid, and mixtures thereof;
   at least one (meth)acrylate monomer M1 having one of the formulae (I), (II) or (III) below:

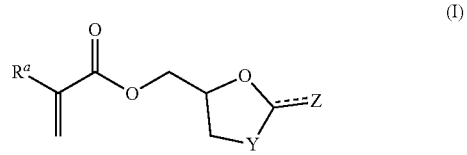

(I)

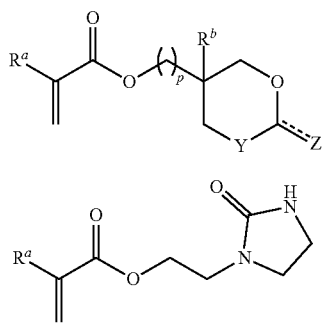

wherein:
R$^a$ represents H or a methyl;
R$^b$ represents H, methyl or ethyl;
p represents 0 or 1; and
Z represents H, O, S, an alkyl group, a benzyl group, an aryl group or an alkoxy group;
Y represents O, S, NH or CH$_2$—;

⟋⟋ is a single bond or a double bond,
on condition that when Z represents O, then the bond ⟋⟋ is a double bond;
a component B comprising an oxidizing agent:
said composition being characterized in that the composition comprises at least one radical photoinitiator in component A and/or B.

2. The composition as claimed in claim 1, characterized in that the reducing agent is selected from the group consisting of tertiary amines, sodium metabisulfite, sodium bisulfite, transition metals, azo compounds, alpha-aminosulfones, and mixtures thereof.

3. The composition as claimed in claim 1, characterized in that the reducing agent is a tertiary amine of formula (IV):

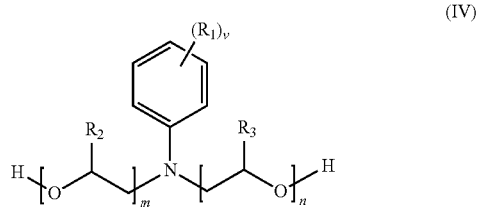

wherein:
m and n are, independently of one another, an integer ranging from 1 to 150;
R$^1$ represents a radical selected from the group consisting of a linear or branched, saturated or unsaturated alkyl comprising from 1 to 20 carbon atoms; a (hetero) aryl comprising from 6 to 12 carbon atoms; a cycloalkyl comprising from 3 to 12 carbon atoms;
v represents an integer ranging from 0 to 5;
R$^2$ and R$^3$ represent, independently of one another, a halogen atom, a hydrogen atom or a linear or branched alkyl group comprising from 1 to 12 carbon atoms, said alkyl group being optionally interrupted by at least one oxygen atom;
on the condition that m+n>2.

4. The composition as claimed in claim 1, characterized in that the radical photoinitiator is selected from the group consisting of:
type I radical photoinitiators chosen from:
the family of acetophenones and alkoxyacetophenones;
the family of hydroxyacetophenones;
the family of alkylaminoacetophenones;
the family of benzoin ethers;
the family of phosphine oxides; and
the family of metallocenes;
type II radical photoinitiators chosen from:
the family of benzophenones;
the family of thioxanthones;
the family of benzoylformate esters;
the family of dibenzylidene ketones;
the family of coumarins;
radical photoinitiators of the family of dyes;
and mixtures thereof.

5. The composition as claimed in claim 1, characterized in that the radical photoinitiator is selected from the group consisting of:
the family of phosphine oxides; and
the family of thioxanthones.

6. The composition as claimed in claim 1, characterized in that it comprises from 0.1% to 5% by weight, of radical photoinitiator(s), relative to the total weight of the composition.

7. The composition as claimed in claim 1, characterized in that the metal salt of (meth)acrylic acid is selected from the group consisting of zinc salts of (meth)acrylic acid, iron salts of (meth)acrylic acid, magnesium salts of (meth)acrylic acid, calcium salts of (meth)acrylic acid, and mixtures thereof.

8. The composition as claimed in claim 1, characterized in that the metal salt of (meth)acrylic acid is selected from the group consisting of zinc diacrylate, zinc dimethacrylate, zinc monomethacrylate, iron diacrylate, iron dimethacrylate, iron monomethacrylate, calcium diacrylate, calcium dimethacrylate, calcium monomethacrylate, magnesium diacrylate, magnesium dimethacrylate, magnesium monomethacrylate, and mixtures thereof.

9. The composition as claimed in claim 1, characterized in that the metal salt of (meth)acrylic acid is a zinc salt.

10. The composition as claimed in claim 1, characterized in that, in formulae (I) and (II), Y represents an oxygen atom.

11. The composition as claimed in claim 1, characterized in that the (meth)acrylate monomer is selected from the group consisting of the following monomers and mixtures thereof:

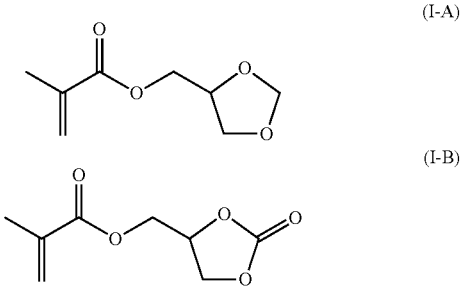

(II-A)
(II-B)
(II-C)
(II-D)
(II-E)

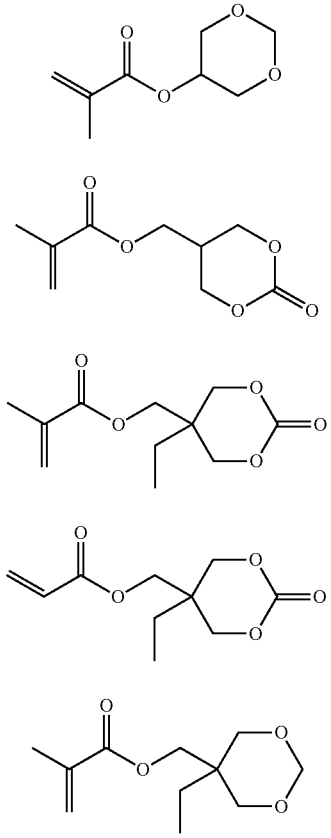

(II-F)

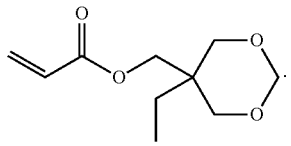

12. The composition as claimed in claim 1, characterized in that component A comprises a total content of (meth) acrylate monomer(s) M1 of greater than or equal to 20% by weight relative to the total weight of said component A.

13. The composition as claimed in claim 1, characterized in that it comprises at least one additive selected from the group consisting of catalysts, fillers, antioxidants, light stabilizers/UV absorbers, metal deactivators, antistatics, film-preventing agents, foaming agents, biocides, plasticizers, lubricants, emulsifiers, dyes, pigments, rheological agents, impact modifiers, adhesion promoters, optical brighteners, flame retardants, anti-sweating agents, nucleating agents, solvents, and mixtures thereof.

14. The composition as claimed in claim 1, characterized in that component A/component B volume ratio ranges from 20/1 to 1/1.

15. An adhesive, mastic or coating comprising the composition as defined in claim 1.

16. A process for assembling two substrates by adhesive bonding, comprising:
  coating, onto at least one of the two substrates to be assembled, a composition obtained by mixing components A and B as defined in claim 1; and then
  bringing the two substrates into effective contact; and
  crosslinking the composition by subjecting it to electromagnetic irradiation.

\* \* \* \* \*